US008320269B2

(12) United States Patent
Baccelli et al.

(10) Patent No.: US 8,320,269 B2
(45) Date of Patent: Nov. 27, 2012

(54) SCALABLE DELAY-POWER CONTROL ALGORITHM FOR BANDWIDTH SHARING IN WIRELESS NETWORKS (75) Inventors: François Baccelli, Meudon (FR); Nicholas Bambos, Hillsborough, CA (US); Nicolas Gast, Eybens (FR)

(73) Assignees: The Board of Trustees of the Leland Stanford Junior University, Palo Alto, CA (US); Institut National de Recherche en Informatique et en Automatique, Le Chesnay Cedex (FR)

( * ) Notice: Subject to any disclaimer, the term of this patent is extended or adjusted under 35 U.S.C. 154(b) by 302 days.

(21) Appl. No.: 12/592,096

(22) Filed: Nov. 18, 2009

(65) Prior Publication Data
US 2010/0124178 A1 May 20, 2010

Related U.S. Application Data (60) Provisional application No. 61/199,723, filed on Nov. 18, 2008.

(51) Int. Cl.
*G08C 17/02* (2006.01)
(52) U.S. Cl. .......................... 370/252; 455/522
(58) Field of Classification Search .................. 370/252; 455/522
See application file for complete search history.

(56) References Cited

U.S. PATENT DOCUMENTS

| 5,450,616 A | 9/1995 | Rom | |
| 5,553,316 A * | 9/1996 | Diepstraten et al. | 370/445 |
| 6,493,541 B1 * | 12/2002 | Gunnarsson et al. | 455/69 |
| 6,529,482 B1 * | 3/2003 | Lundby | 370/252 |
| 6,778,839 B2 * | 8/2004 | Valkealahti | 455/522 |
| 7,634,287 B1 * | 12/2009 | Bambos et al. | 455/522 |
| 7,813,753 B2 * | 10/2010 | Santhanam | 455/522 |
| 2009/0245262 A1 * | 10/2009 | Ariyur et al. | 370/400 |

OTHER PUBLICATIONS

Bambos et al., "Distributed Backlog-Driven Power Control in Wireless Networking," Oct. 13, 2007, pp. 13-18, Local & Metropolitan Area Networks, 2007. Lanman 2007. 15th IEEE Workshop, Princeton, NJ.
Bambos et al., "Target-Driven and Incentive-Aligned Power Control for Wireless Networks," Nov. 26-30, 2007, pp. 4467-4472, Global Telecommunications Conference, 2007. GLOBECOM '07. IEEE, Washington, DC.

(Continued)

*Primary Examiner* — Ricky Ngo
*Assistant Examiner* — Ben H Liu
(74) *Attorney, Agent, or Firm* — Lumen Patent Firm (57) ABSTRACT A distributed power control technique for wireless networking efficiently balances communication delay against transmitter power on each wireless link. Packets are transmitted over a wireless link from a transmitter to a receiver using a dynamically controlled transmit power level that is periodically updated at the transmitter. The transmit power is computed from i) an observed noise plus interference value of the wireless link and ii) a parameter that determines a balance between per-packet average delay and per-packet average power. In a preferred implementation, the dynamically controlled transmit power level is computed by minimizing the sum of an average delay cost and an average power cost, weighted by the parameter.

2 Claims, 4 Drawing Sheets

OTHER PUBLICATIONS

Bambos et al., "Media and data traffic coexistence in power-controlled wireless networks," 2005, pp. 76-85, WMuNeP '05 Proceedings of the 1st ACM workshop on Wireless multimedia networking and performance modeling, ACM, New York, NY, USA.

Bambos et al., "Power-controlled packet relays in wireless data networks," Dec. 1-5, 2003, pp. 464-469, vol. 1, Global Telecommunications Conference, 2003. GLOBECOM '03. IEEE.

Bambos et al., "A fuzzy reinforcement learning approach to power control in wireless transmitters," Aug. 2005, pp. 768-778, vol. 35 Issue:4, IEEE Transactions on Systems, Man, and Cybernetics, Part B: Cybernetics.

Bambos et al., "Power-controlled multiple access schemes for next-generation wireless packet networks," Jun. 2002, pp. 58, vol. 9 Issue:3, Wireless Communications, IEEE.

Bambos et al., "Integrated power control for circuit & packet switched traffic in wireless networks," Oct. 6-9, 2003, pp. 2604-2609, vol. 4, 2003 IEEE 58th Vehicular Technology Conference, 2003. VTC 2003-Fall.

* cited by examiner

SCALABLE DELAY-POWER CONTROL ALGORITHM FOR BANDWIDTH SHARING IN WIRELESS NETWORKS

CROSS-REFERENCE TO RELATED APPLICATIONS

This application claims priority from U.S. Provisional Patent Application 61/199,723 filed Nov. 18, 2008, which is incorporated herein by reference.

FIELD OF THE INVENTION

The present invention relates generally to wireless communication systems and methods. More specifically, it relates to techniques for wireless bandwidth sharing among multiple wireless devices sharing a wireless network.

BACKGROUND OF THE INVENTION

Intelligent selection of transmitter power control (and related rate control) is important in wireless networking for maintaining communication quality in the presence of interference, increasing network capacity, reducing power consumption, and so on. Selecting a high transmit power increases the signal power at the receiver, resulting in a higher signal-to-noise ratio and higher data transmission rates. However, increasing transmit power also results in higher power consumption and higher levels of interference between links. Consequently, techniques for power control involve complicated trade-offs that depend on the specific nature and conditions of the wireless network. Moreover, because these specifics often change in time as devices join and leave the network and as demands on the network change, effective power control must dynamically adapt to these changing conditions. In contrast with centralized power control techniques, distributed power control techniques are further complicated due to the presence of many devices sharing the wireless network and the need to ensure that a given power control technique converges to a stable and desirable power levels for all devices.

The Foschini-Miljanic (FM) algorithm is the seminal distributed transmitter power control technique for wireless networks. It provides distributed power control of ad-hoc networks with user-specific signal-to-interference ratio (SIR) requirements and yields minimum transmitter powers that satisfy those SIR requirements. According to the FM algorithm, each communication link i in the shared wireless channel sets a target signal to interference plus noise ratio (SINR), $\gamma_i^*$. Each transmitter then aims to achieve $\gamma_i^*$ in each time slot by autonomously updating its transmitter power $P_i^t$, using the control algorithm $$P_i^{t+1} = (\gamma_i^*/\gamma_i^t) P_i^t \qquad (1)$$

in consecutive time slots, where $\gamma_i^t$ is the SINR of link i observed in time slot t. The SINR $\gamma_i^t$ of link i observed in time slot t is measured at the receiver of link i and communicated to the transmitter (e.g., over a separate control channel). Thus, although there is intra-link communication from the receiver to the transmitter, there is no cross-link communication and each link acts autonomously, a highly desirable property for scalability. In this sense the FM algorithm is distributed. However, there is need to ensure that the SINR targets $\gamma_i^*$ are all feasible so that the power levels do not explode. If the target SINRs $\gamma_i^*$ are feasible for all links i, then the FM algorithm will provably converge to the set SINR targets $\gamma_i^*$. If not, all transmit power levels will diverge to infinity. (The asynchronous version of this FM control algorithm converges or diverges similarly.) Therefore, this is an essential global requirement, compromising somewhat the distributed nature of the algorithm. Note that by fixing a target SINR $\gamma_i^*$, each link i essentially sets a fixed desirable effective transmission rate, hence, link communication delay. Therefore, the FM algorithm does not manage the delay/power tradeoff, a fundamental issue in wireless communication.

Various other techniques for addressing the power control problem have been proposed. Some aim to maximize the minimum SINR of any link sharing the wireless channel, instead of managing the power/delay tradeoff. Game theoretic and utility maximization approaches require various degrees of link coordination and do not control the delay vs. power tradeoff explicitly. Accordingly, there remains a need for dynamic power control techniques in wireless networks that overcome these limitations.

SUMMARY OF THE INVENTION

In one aspect, the present invention provides a delay-power control (DPC) technique for wireless networking. The technique efficiently balances out communication delay against transmitter power on each wireless link. The DPC technique is scalable, as each link autonomously updates its power based on the interference observed at the receiver; no cross-link communication is required. DPC converges to a unique equilibrium power. Two protocols are provided which leverage adaptive tuning of DPC parameters.

In one aspect, a method is provided for wireless communication in a wireless network including a transmitter and receiver sharing a wireless medium. The method includes transmitting packets over a wireless link from a transmitter to a receiver using a dynamically controlled transmit power level and periodically updating at the transmitter the dynamically controlled transmit power level. The dynamically controlled transmit power level is computed from i) an observed noise plus interference value of the wireless link and ii) a parameter that determines a balance between per-packet average delay and per-packet average power. Periodically, the transmitter receives the observed noise plus interference value of the wireless link from the receiver. The observed noise plus interference value may be received, for example, at the end of each time slot or at other predefined intervals. Similarly, the transmit power level may be updated at the end of each time slot or at other predefined intervals.

The dynamically controlled transmit power level is preferably computed by minimizing the sum of an average delay cost and an average power cost, weighted by the parameter. For example, the dynamically controlled transmit power level P may be computed by evaluating $$P = \mathrm{argmin}_p \left\{ \frac{\alpha}{S(p/b)} + \frac{p}{S(p/b)} \right\},$$

where $\alpha$ is the parameter that determines the balance between per-packet average delay and per-packet average power, b is the observed interference plus noise value of the wireless link, and S is a predetermined increasing function that relates an effective transmission rate of the link to a given signal to interference plus noise value. Alternatively, the dynamically controlled transmit power level P may be computed by evaluating $$P = \operatorname{argmin}_p \left\{ \frac{\alpha}{S(p/b) - \lambda} + \frac{p}{S(p/b)} \right\},$$

where λ is a transmitter queue packet arrival rate.

According to one specific embodiment, the method further includes setting a target signal to interference plus noise value equal to an equilibrium signal to interference plus noise value scaled down by a constant multiplicative factor, and periodically updating at the transmitter the dynamically controlled transmit power level to attain the target signal to interference plus noise value.

According to another specific embodiment, the method further includes increasing by a predetermined constant the parameter that determines a balance between per-packet average delay and per-packet average power, periodically updating at the transmitter the dynamically controlled transmit power level, setting a target signal to interference plus noise value equal to an equilibrium signal to interference plus noise value scaled down by a constant multiplicative factor, and periodically updating at the transmitter the dynamically controlled transmit power level to attain the target signal to interference plus noise value.

DETAILED DESCRIPTION

Figure 1:
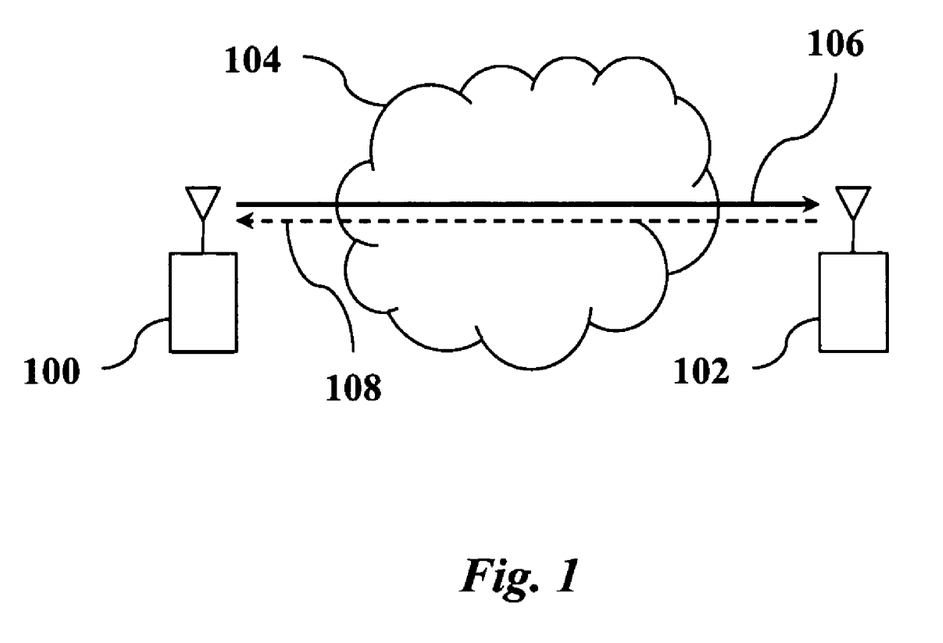
FIG. 1 is a schematic diagram illustrating a wireless network in which a power control method of the invention may be implemented. The network includes a transmitter, a receiver, a wireless link, and a shared wireless medium, according to FIG. 2 is a flow chart illustrating the main steps of a method for wireless communication using a power control technique of the present invention.

According to preferred embodiments of the invention, methods for power control in wireless networks are provided in which each wireless link selfishly manages its power vs. delay tradeoff in response to the interference generated by other links sharing the channel. FIG. 1 shows a wireless network which may be used to implement a power control method of the invention. The network includes a transmitter 100, a receiver 102, and a shared wireless medium 104. A data link 104 from the transmitter 100 to the receiver 102 is used to communicate data packets.

In general, the wireless network may include any number of transceivers with L communication links, indexed by i, sharing the same wireless medium and interfering with each other. It is assumed that each communication link 106 has a corresponding control link 108 for sending acknowledgements and signal to noise plus interference (SNR) values back from the receiver 102 to the transmitter 100. Communication over the wireless link 106 takes place by transmitting packets in a sequence of time slots, indexed by t.

The power transmitted by the transmitter of link i in time slot t is denoted by $P_i^t$ and is preferably constant throughout the time slot. The thermal noise at the receiver of link i is constant $N_i$ in all time slots. The power gain (attenuation) from the transmitter of link j to the receiver of link i is $G_{ij}$ and is also constant in time. Hence, $G_{ij}P_j^t$ is the interference power induced on the receiver of link i by the transmitter of link j in time slot t, and $G_{ii}P_i^t$ is the signal power received at receiver of link i from the transmitter of link i.

The total interference plus noise experienced by link i in time slot t is $$N_i + \Sigma_{j \neq i} G_{ij} P_j^t,$$

and the signal to interference plus noise ratio (SINR) of link i at time t is given by $$\gamma_i^t = (G_{ii} P_i^t)/(N_i + \Sigma_{j \neq i} G_{ij} P_j^t) = P_i^t / b_i^t$$

where $$b_i^t = N_i/G_{ii} + \Sigma_{j \neq i} G_{ij} P_j^t / G_{ii}$$

is the total noise plus interference of link i, resealed by the intralink power gain $G_{ii}$. The value for $b_i^t$ is empirically measured by the receiver of link i. The goal of the power control technique is to determine an optimal transmit power $P_i^{t+1}$ from the measured value $b_i^t$. We can express this as the evaluation of a function $$P_i^{t+1} = \Phi_i(b_i^t),$$

where the function $\Phi_i$ depends on a parameter $\alpha_i$ that determines the balance between per-packet power and delay costs. Because each link i acts autonomously, without loss of generality, the essential features of the power control technique may be described more simply in terms of one specific link 106, in which case the index i may be omitted. Thus, we may write, for a given link, $$P^{t+1} = \Phi(b^t),$$

where the function Φ for the link depends on a parameter α for the link that determines the link's particular balance between per-packet power and delay costs.

Figure 2:
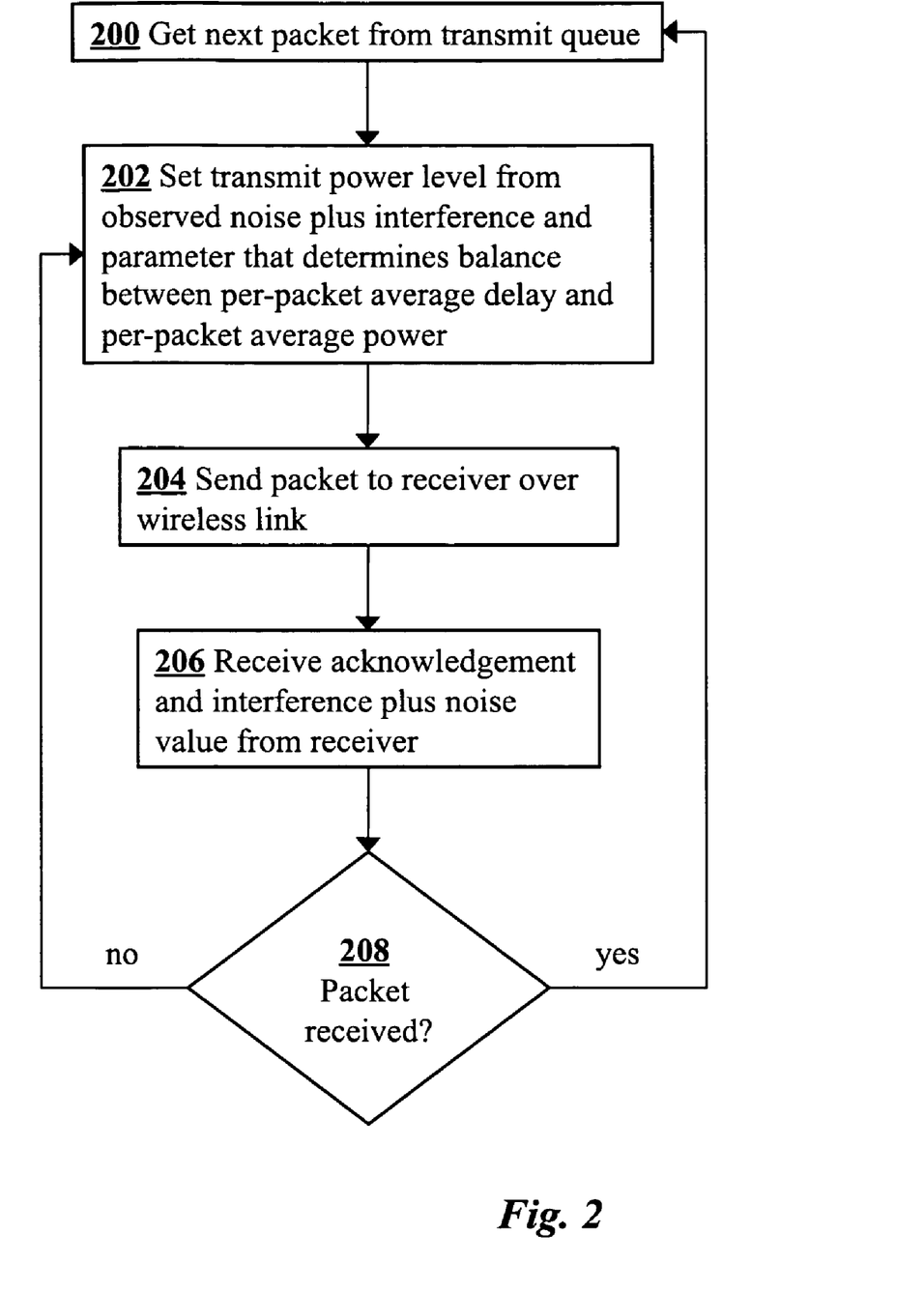

FIG. 2 is a flow chart illustrating the main steps of a method for wireless communication using a power control technique of the present invention. In step 200 a next packet is taken from the front of the data transmission queue at the transmitter. In step 202 the transmitter computes a transmit power level $P^t = \Phi(b^{t-1})$ of the current time slot t from the observed noise plus interference value $b^t$ of the previous time slot t−1. In step 204 the packet is transmitted from the transmitter to the receiver using the computed power level. In step 206 the transmitter receives an acknowledgement from the receiver which indicates whether or not the packet was successfully received in the previous time slot. In addition, the transmitter also receives from the receiver a value for the interference plus noise that was observed by the receiver in the previous time slot. In decision step 208, if the received acknowledgement indicates that the packet was received successfully, then control is transferred to step 200 where the packet is removed from the transmit queue, the next packet in the queue is fetched (if any) and the process repeats by sending a packet in each successive time slot until all packets in the queue are sent successfully. Otherwise, if the received acknowledgement indicates that the packet was not received successfully (e.g., due to interference/noise in the link), then control is transferred to step 202 where the transmit power level is again set in step 202 and the same packet is retransmitted in step 204.

At the end of each time slot, the receiver of each link communicates to its transmitter 1) the interference it observed during the ending time slot, and 2) an acknowledgement whether the transmitted packet was received correctly or not (i.e., ACK/NACK signal). For simplicity, we assume that this reverse-communication occurs on a reliable network control channel, separate from the data channel shared by the links. This control channel need only be a low rate one, since the information transmitted per time slot (interference value and acknowledgements) is minimal. In any case, the receiver acknowledges success/failure in packet reception and interference values could be piggy-backed on the ACK/NACK signals. Although this signaling introduces intra-link communication, no cross-link communication is needed. Therefore, the links rather than devices are autonomous and distributed in this method.

For simplicity, it is assumed that transmission success/failure events are statistically independent across successive time slots with probabilities that depend on each link's SINR. Specifically, we define the function $S(\gamma)=S(P/b)$ for a link to be the probability that a packet transmitted over the link will be successfully received in a time slot for a given SINR $\gamma$ of the link in the time slot. The success probability function $S(\gamma)$ may be different for each link, depending the modulation scheme used, the radio propagation environment, and other factors. The function $S(\gamma)$ is naturally assumed to be an increasing function of the SINR $\gamma$. Examples of such functions are $S(\gamma)=\gamma/(\xi+\gamma)$ for some positive constant $\xi$, or $S(\gamma)=1-e^{-\delta\gamma}$ for some positive constant $\delta$ which depends on system-specific particulars. Note that $S(\gamma)$ is proportional to the effective transmission rate of the link under SINR $\gamma$. Actually, we later extend/relax $S(\gamma)$ to include the information theoretic transmission rate $S(\gamma)=\ln(1+\gamma)$ of the Gaussian channel.

The power control method is based on the following idea. At each point in time each link selects a power level that balances 1) the expected power spent to successfully transmit the packet (information block) under transmission (per-packet average power) against 2) to the expected delay until successful packet transmission (per-packet average delay), given the current interference it experiences in the channel. Significantly, this power control technique converges to a collective unique equilibrium when used by each link (even asynchronously). Note that in contrast to the FM algorithm which is designed to support constant rate traffic on each link, DPC is designed to primarily support elastic traffic on heterogeneous links.

Since DPC manages the per-packet (information block) delay vs. power tradeoff by choosing how much to weigh or value delay vs. power (as seen later), it is very flexible in the following sense. In diverse wireless networking scenarios, power-conscious nodes transmitting elastic traffic (sensors, agents, etc.) could set the delay weight low (leading to higher delay and lower power); but power-oblivious nodes transmitting delay-sensitive traffic (voice, media streaming, etc.) could set the delay weight high (squeezing the delay down at the expense of higher power). Since DPC allows each link to individually choose how to weigh delay vs. power (and is also distributed), it would be particularly appropriate even for highly heterogeneous mixtures of delay-tolerant and delay-sensitive links coexisting in wireless channels.

According to a preferred embodiment, each link i controls its transmitter power autonomously, based on the following rationale. The receiver first observes b, the current interference plus noise value and communicates it to the transmitter at the end of time slot t. Then, the transmitter reasons that 1) if the other links do not change their powers in the future and 2) the link transmits at constant power P in the future, it will have to transmit the packet in line for transmission for an average of $1/S(\gamma)$ time slots at power P, before it is successfully received at the receiver, where $\gamma=P/b$. Recall it is assumed that packet transmission success/failure events are statistically independent. Therefore, the link will incur an average delay cost of $1/S(\gamma)$ and an average power cost of $P/S(\gamma)$ until the packet under transmission is successfully received. In response, the link chooses its power in the next slot t+1 so as to minimize a weighted combination of the per-packet power and delay costs:

$$P = \Phi(b) = \mathrm{argmin}_p \left\{ \frac{\alpha}{S(p/b)} + \frac{p}{S(p/b)} \right\}$$

where the minimization is taken over values of $p \geq 0$. The weight parameter $\alpha$ reflects how the link weighs delay vs. power.

Each link performs the power update independently (autonomously), without any communication with other links, hence, the power control algorithm is distributed. Of course, as soon as any link updates its power, the value of b changes for all other links, so the power needs to be updated again for the next time slot. Note that, roughly speaking, each link optimizes selfishly (over the set of links) and myopically (over time slots) its delay/power tradeoff per transmitted packet, assuming that all other links will not change their powers. As the latter do, the link observes the new interference and repeats the process.

In the special case where $S(x)=x/(x+1)$, direct calculations show that $\Phi(b)=\sqrt{(\alpha b)}$. Hence, the SINR for interference b is $\sqrt{(\alpha/b)}$. We see here how the response of a link to some interference stress b may be scaled up or down by tuning the $\alpha$ parameter: a power conscious link will chose a small $\alpha$ value whereas a power oblivious one might chose a larger $\alpha$ value. In general, $\Phi(b)$ might not be obtainable in closed form for some $S(\gamma)$ and may have to be computed off-line and stored into look-up tables for each transmitter to use when calculating its updated power level.

Another way of understanding the delay-power control algorithm is to view $S(\gamma)$ as the communication rate of the link, which is assumed to be an increasing function of the SINR value $\gamma$. For example, $S(\gamma)=\ln(1+\gamma)$. Then, $1/S(\gamma)$ can be viewed as the per bit delay (time stretch) on the link. In this context, power control function $\Phi(b)$ is simply trying to minimize selfishly and myopically the weighted sum of the power/rate ratio (power per bit) and delay (time stretch per bit). To incorporate this digital communication perspective in our model we allow $S(\gamma)$ to be any increasing function of $\gamma$ and is not limited to a probability function.

It should be noted that the power control technique described herein can easily be relaxed to an asynchronous version, where each link updates its power at arbitrary time slots, observing the interference in only the latest one. In general, the power is not necessarily updated for every time slot, but may be updated at fixed periodic time intervals, adaptively selected time intervals, or arbitrary time intervals. Similarly, the value for b is not necessarily received from the receiver every time slot, but may be received at fixed periodic time intervals, adaptively selected time intervals, or arbitrary time intervals.

In another embodiment of the invention, the distributed (scalable) delay-power control technique for elastic wireless traffic, managing the per-packet (or bit) average delay vs. power tradeoff, can be extended to include a queuing delay cost in the control, beyond the processing delay $1/S(\gamma)$ taken into account before. Suppose that in each time slot a packet arrives at the transmitter queue of link with probability $\lambda$. Packet arrival events are independent of each other and all packet transmission success/failure events. If the interference $\gamma$ were not to change on the link, then its transmitter queue could be modeled as a standard discrete-time queue (birth-death chain) with arrival rate $\lambda$ and service rate $S(\gamma)$. The average sojourn time (queuing plus processing time) incurred by a packet in the queue would simply be $1/(S(\gamma)-\lambda)$. Therefore, each link could selfishly and myopically seek to optimize its weighted sum of average power and sojourn time per packet, leading to the power control function $$P = \Phi(b) = \operatorname{argmin}_p \left\{ \frac{\alpha}{S(p/b) - \lambda} + \frac{p}{S(p/b)} \right\}$$

where the minimization is taken over values of $p \geq 0$ and the weight parameter $\alpha$ reflects how the link balances the packet sojourn time vs. the power. In order for the algorithm to be well defined, we assume that $\lambda < \lim_{\lambda \to \infty} S(\gamma)$. Otherwise, the queues would not be locally stable even if no other link is transmitting.

Based on the DPC techniques described above, we now proceed to consider some specific protocols based on DPC which may be used for efficient channel sharing by links. Protocols are based on DPC when $\lambda=0$.

Each link may choose its delay/power weight $\alpha$ selfishly, expressing its desired balance between delay and power. The choice of $\alpha$ could reflect inherent individual preference, belief, intrinsic utility, or simply liking (whether well chosen or not) in the interest of full link autonomy. However, when the link attains its equilibrium operational point and observes its equilibrium delay vs. power balance, it may reassess its preferences, 'change its mind' and adapt in an effort to reach a better equilibrium point. For example, it may change its $\alpha$ value, or set some SINR target and invoke the FM algorithm to attain it, or both. There are various ways for each link to adjust its preferences and parameters, and these techniques can be implemented as different specific protocols, based on the same fundamental DPC techniques described above.

In general, it is possible for the link system to be in 'deep saturation' or over-saturation, that is, each link is using high power with minuscule differential return in SINR. However, if each link i contracts its a somewhat, the system can rapidly de-saturate. At this 'near-saturation' regime additional power can result in substantial additional performance (SINR) on each link.

As examples, we now describe two specific implementations of DPC (formulated as protocols) for reaching near-saturation but avoiding over-saturation. Saturation-averse DPC (SA-DPC) and a rate-aggressive DPC (RA-DPC). SA-DPC backs off from saturation when it settles in and RA-DPC aims for highest SINRs and link rates, up to the point of avoiding saturation.

Figure 3:
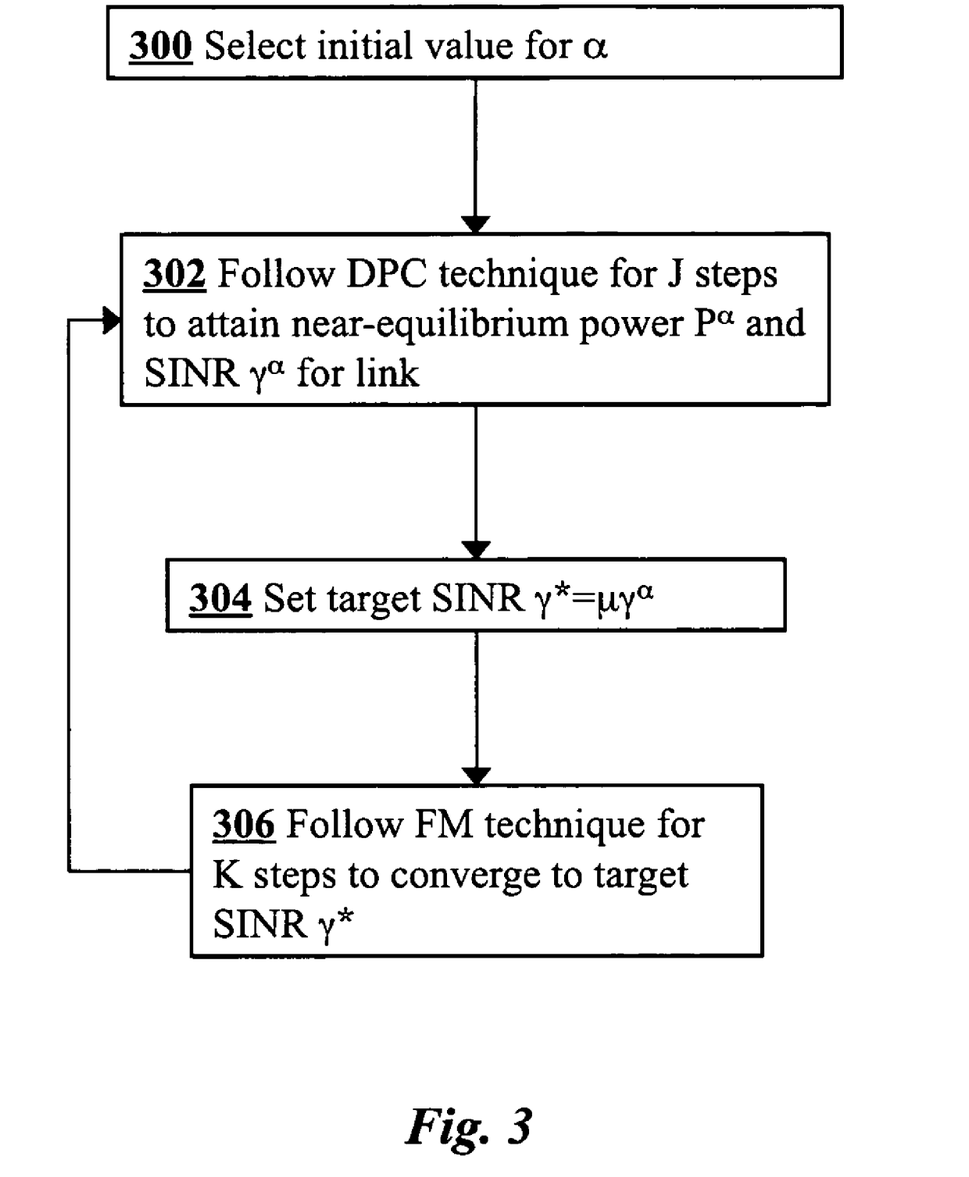
FIG. 3 is a flow chart illustrating the steps of a first protocol that uses the power control method of the present invention.

The SA-DPC protocol, as illustrated in FIG. 3, augments DPC with a subsequent phase of contracting a link system in over-saturation back to near or sub-saturation, where increased power is well-spent for performance (SINR). In step 300, each link autonomously and independently selects a (link-specific) initial value for $\alpha$. SA-DPC then implements two operational phases. During phase 1, shown in step 302, the DPC algorithm is applied, which leads to equilibrium (or near-equilibrium) power $P^\alpha$ and SINR $\gamma^\alpha$ for the link. The DPC algorithm is followed in this phase for J time slots, where J is taken to be large enough so that DPC equilibrium is largely attained (DPC converges fast). After phase 1 is completed, in step 304, the link scales its (largely) attained equilibrium SINR $\gamma^\alpha$ down by a constant factor $\mu$, where $0 < \mu < 1$ and $\mu$ is close to 1 (e.g., $\mu=0.95$). Specifically, a new SINR target value $\gamma^*$ is set to $\gamma^* = \mu \gamma^\alpha$. The standard FM algorithm is then applied in phase 2, shown in step 306. The FM algorithm is followed for K time slots, where K is taken to be large enough so that the FM equilibrium is largely attained (FM converges fast). The FM algorithm is guaranteed to converge to $\gamma^*$ (at minimum power) because the $\gamma^*$ value for each link is automatically feasible. The SA-DPC steps above are preferably repeated periodically in order to cope with changes in link conditions such as entry or exit of other links from the shared wireless network.

Figure 4:
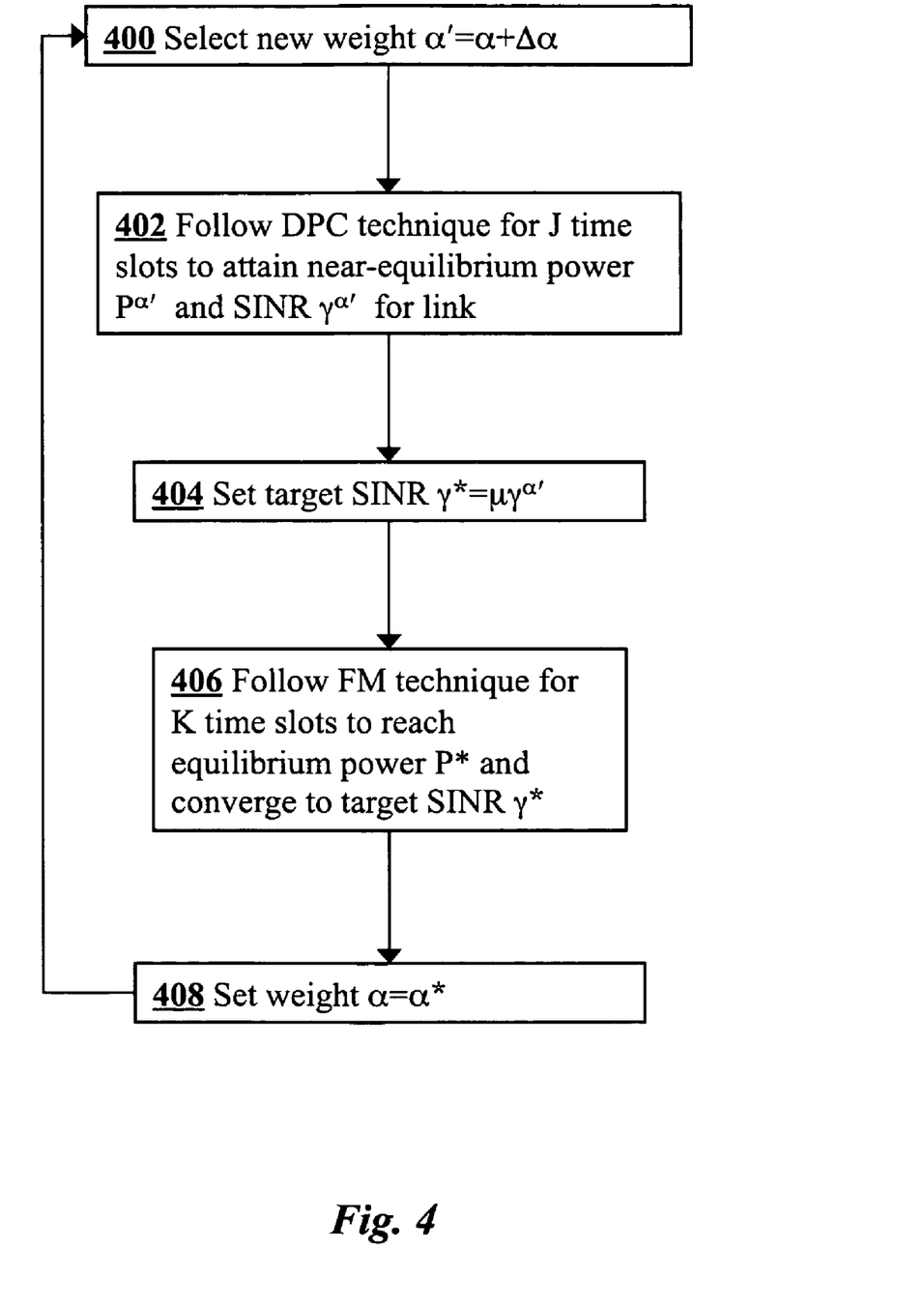
FIG. 4 is a flow chart illustrating the steps of a second protocol that uses the power control method of the present invention.

The RA-DPC protocol, as illustrated in FIG. 4, adapts the value of $\alpha$ to attain the highest to possible SINR $\gamma$ for the link (and hence rate $S(\gamma)$ also) without oversaturating and wasting power in the process. RA-DPC is designed to be:
(i) generous—it operates near saturation delivering high feasible SINRs (rates);
(ii) efficient—it does not oversaturate and waste power;
(iii) fair—no link is starved;
(iv) distributed—no cross-link communication is needed.

The RA-DPC protocol (synchronous version) begins in step 400 by making an additive increase in the weight $\alpha$. Specifically, the link increases its previous delay/power weight a by and amount $\Delta\alpha$ to a new weight value $\alpha'=\alpha+\Delta\alpha$, where the increment $\Delta\alpha>0$ is a predetermined parameter of the RADPC protocol. In step 402, the DPC algorithm is followed using, leading to an equilibrium (or near-equilibrium) power $P^{\alpha'}$ and SINR $\gamma^{\alpha'}$ for the link. The DPC algorithm is followed in this phase for J time slots, where J is taken to be large enough so that DPC equilibrium is largely attained (DPC converges fast). This additive increase phase is designed with the desirable property (i) above in mind.

After the additive increase phase is completed, in step 404 the link scales its (largely) attained equilibrium SINR $\gamma^{\alpha'}$ down by a constant factor $\mu$, where $0 < \mu < 1$ and $\mu$ is close to 1 (e.g., $\mu=0.95$). Specifically, a new SINR target value $\gamma^*$ is set to $\gamma^* = \mu \gamma^{\alpha'}$. Note that the multiplicative decrease of SINRs is designed with the desirable property (ii) above in mind. The value of $\mu$ is a protocol parameter that can be adjusted.

Then, in step 406, the link follows the FM algorithm for K time slots, reaching equilibrium power $P^*$. The number of steps K is chosen to be large enough so that FM equilibrium is largely attained. After the end of the FM phase, in step 408 the link computes a new weight $$\alpha^* = P^* \left[ \frac{1}{\gamma^*} \frac{S(\gamma^*)}{\frac{dS(\gamma^*)}{d\gamma}} - 1 \right]$$

and the link resets the value of the weight $\alpha$ to the computed $\alpha^*$, that is, $\alpha = \alpha^*$. The protocol steps above are then repeated, starting at step 400.

The RA-DPC described above can be viewed as being 'rate-aggressive' because, on the one hand, the additive increase of a tries to progressively drive the SINR $\gamma$ higher (hence, rate $S(\gamma)$ too). On the other hand, the multiplicative decrease of $\gamma$ is 'saturation averse' and prevents the system from going into over-saturation.

We have gathered substantial experimental evidence (from numerical simulations) that the synchronous version of RA-DPC converges to a SINR equilibrium point in the feasibility region, where each link has non-zero SINR and, hence, is not 'starved'—in line with desirable property (iii) above. A remarkable observation is that the synchronous RA-DPC appears to always converge to the same equilibrium point, irrespectively of the initial value for $\alpha$. The equilibrium point depends on the gain matrix $G_{ij}$, the receiver thermal noise vector N, and the protocol parameters $\mu$ and $\Delta\alpha$. In contrast, the raw DPC equilibrium point depends on $G_{ij}$, N, and the delay/power weight parameter $\alpha$.

In an asynchronous version of RA-DPC the steps in the protocol are not necessarily synchronized between links, so that the additive increase in $\alpha$, for example, does not take place in the same time slot for all links in the wireless network. Numerical experiments of the asynchronous RA-DPC suggest that it has good robustness and exhibits good compliance with the desirable properties (i)-(iv) previously mentioned.

Other variants of RA-DPC are also possible. For example, the additive increase of a can be replaced by a multiplicative increase or other type of increase. Also, the multiplicative decrease in $\gamma$ could be replaced by a subtraction or other type of decrease.

The DPC methods may also be supplemented with various techniques for detecting and responding to network congestion, e.g., using 'saturation' or 'stress' signals. In DPC a natural 'saturation indicator' could be the efficiency of a change in $\alpha$. Consider, for example, an increase of $\alpha$ to $\alpha'$ that results in a shift in the equilibrium power from P to P' and a shift in the equilibrium SINR from $\gamma$ to $\gamma'$. The efficiency of this change can be defined as $E=(\gamma'-\gamma)/(P'-P)$. One expects that when the system is in saturation the efficiency E associated with a change in a will be small, because even a large increase in power will result in a small increase in SINR performance. On the contrary, if the system is far enough from saturation the efficiency E associated with a change in $\alpha$ will be large, because even a moderate increase in power will result in substantial increase in SINR. Therefore, the value of E at each link could be used as part of a method for detecting saturation.

The preferred version of DPC-based protocol is RA-DPC, which we have observed performing well under diverse operational scenarios. RA-DPC aims at sharing bandwidth for elastic traffic according to generic principles (i)-(iv) that are similar to those underpinning the design of TCP. Although the 'additive increase-multiplicative decrease' scheme is similar to TCP Reno, RA-DPC does not implement a reactive decrease as does TCP. A deeper difference stems from the fact that the interaction between flows on wireless links is quite different from that in wireline networks.

The invention claimed is:

1. A method for wireless communication comprising:
   transmitting packets over a wireless link from a transmitter to a receiver using a dynamically controlled transmit power level, wherein the transmitter and receiver belong to a wireless network sharing a wireless medium; and
   periodically updating at the transmitter the dynamically controlled transmit power level, wherein the dynamically controlled transmit power level is computed from i) an observed noise plus interference value of the wireless link and ii) a parameter that determines a balance between per-packet average delay and per-packet average power;
   wherein the dynamically controlled transmit power level P is computed by evaluating $$P = \mathrm{argmin}_p \left\{ \frac{\alpha}{S(p/b)} + \frac{p}{S(p/b)} \right\},$$

where a is the parameter that determines the balance between per-packet average delay and per-packet average power, b is the observed interference plus noise value of the wireless link, and S is a predetermined increasing function that relates an effective transmission rate of the link to a given signal to interference plus noise value.

2. A method for wireless communication comprising:
   transmitting packets over a wireless link from a transmitter to a receiver using a dynamically controlled transmit power level, wherein the transmitter and receiver belong to a wireless network sharing a wireless medium; and
   periodically updating at the transmitter the dynamically controlled transmit power level, wherein the dynamically controlled transmit power level is computed from i) an observed noise plus interference value of the wireless link and ii) a parameter that determines a balance between per-packet average delay and per-packet average power;
   wherein the dynamically controlled transmit power level P is computed by evaluating $$P = \mathrm{argmin}_p \left\{ \frac{\alpha}{S(p/b) - \lambda} + \frac{p}{S(p/b)} \right\},$$

where a is the parameter that determines the balance between per-packet average delay and per-packet average power, b is the observed interference plus noise value of the wireless link, l is a transmitter queue packet arrival rate, and S is a predetermined increasing function that relates an effective transmission rate of the link to a given signal to interference plus noise value.

* * * * *